United States Patent Office 3,433,840
Patented Mar. 18, 1969

3,433,840
PROCESS FOR RECOVERING ACROLEIN BY QUENCHING, ABSORPTION AND PLURAL DISTILLATION
Takesaburo Shima, Yoshitsugu Sawaki, Katsuyoshi Tokunaga, Masao Sada, and Tetuji Takimoto, Niihama-shi, Japan, assignors to Sumitomo Chemical Company, Ltd., Osaka, Japan, a corporation of Japan
Filed Dec. 26, 1967, Ser. No. 693,651
Claims priority, application Japan, Dec. 29, 1966, 42/625
U.S. Cl. 260—604
Int. Cl. C07c 45/04
4 Claims

ABSTRACT OF THE DISCLOSURE

In the process for recovering acrolein from the gaseous reaction mixture obtained by gas phase catalytic oxidation of propylene, an improvement comprising quenching the reaction mixture to a relatively high temperature such as 30 to 80° C., separating a condensate formed, and contacting the remaining gas with water while or after cooling to a further lower temperature to form an aqueous acrolein solution. The condensate is distilled without combining with the aqueous acrolein solution. The process is conducted continuously in the yield of above 85% without any troubles due to the polymerization of acrolein.

---

Figure 1:
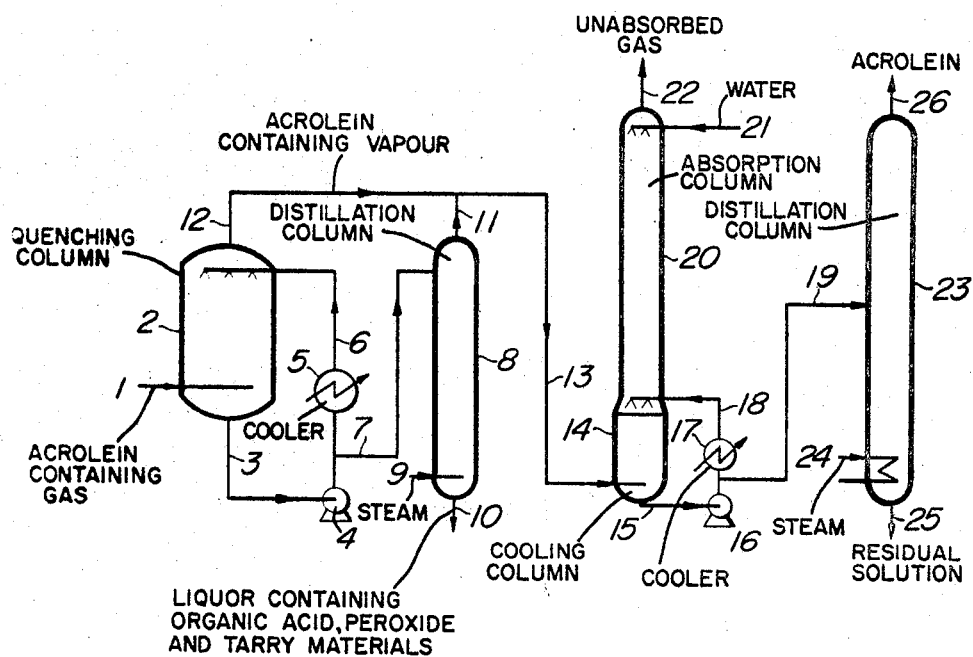

The present invention relates to a process for recovering acrolein from the gaseous reaction mixture obtained by gas phase catalytic oxidation of propylene. More particularly, it relates to an improvement in such process of recovering acrolein in good yield with preventing polymerization of acrolein.

Acrolein is important material as a raw material for resins, processing agents of textile, diets, dyestuffs, perfumery or pesticides.

Acrolein has been produced by passing propylene and a gas containing molecular oxygen through a catalyst bed at a temperature of 230 to 500° C. in the presence of a diluent such as steam to cause the gas phase catalytic oxidation. The resulting gaseous reaction mixture in such process contains, beside the objective acrolein, various substances which are the diluent, unreacted propylene, oxygen, carbonyl compounds such as acetaldehyde, propionaldehyde and acetone, organic acids such as acrylic acid and acetic acid as by products, steam, carbon mono and dioxides, and small amounts of tarry materials and peroxides. Acrolein is naturally so reactive that it tends to readily polymerize or to react with water to form hydrate. Thus, it is a very difficult problem to selectively recover acrolein with a small loss from the reaction mixture containing such components.

There has been used for recovering acrolein from the gaseous reaction mixture obtained by gas phase catalytic oxidation of propylene a process comprising, in general, quenching said reaction mixture and separating a condensate therefrom, contacting the remaining gas with water to form an aqueous acrolein solution, and usually concentrating and purifying the aqueous solution to recover acrolein. Since acrolein is very reactive as stated above, the quenching in the above process has been effected by lowering the temperature of the gaseous reaction mixture at once to below 20° C. and separating the condensate. In this case, however, there occurs the mingling of much amount of acrolein into the condensate which causes the loss of acrolein due to polymerization and hydration thereof. Thus, the total yield in the acrolein recovering process is only about 80 percent by weight based on the weight of acrolein contained in the reaction mixture even when the amount of acrolein is calculated by the sum of the amounts resulted both from the aqueous acrolein solution and the condensate.

In addition, the recovery of acrolein from the condensate has been effected in the prior art by introducing the condensate into the steps of the concentration and purification of the aqueous acrolein solution and distilling together with said solution. In such case, however, there are disadvantages that further polymerization of acrolein causes not only the loss of acrolein but also so heavy blocking of the stripper used in the distillation as to allow the continuous distillation only for several days. For the improvement of these disadvantages, it has been proposed to add a polymerization inhibitor such as hydroquinone and metallic ions such as $Mg^{++}$, $Ca^{++}$, $Zn^{++}$ or $Al^{+++}$ to the quenching and absorbing steps. However, this is not economical since it necessitates a considerable amount of hydroquinone based on acrolein, for example, 0.2 part by weight of hydroquinone per 100 parts by weight of the aqueous solution containing 1.5 percent by weight of acrolein.

The present inventors have found from their studies that the loss of acrolein in the recovery process is mainly based on the polymerization of acrolein and acrylic acid initiated by the peroxides contained in the gaseous reaction mixture and the polymerization of $\beta$-hydroxypropionaldehyde which is formed from acrolein due to the great increase of the hydration reaction rate of acrolein in the presence of the organic acids.

The present inventors further have found that the aqueous acrolein solution is obtained in good yield by effecting the cooling of the gaseous reaction mixture in two steps and in the first step quenching said reaction mixture to a relatively high temperature whereby separating the condensate formed from the uncondensed vapour and then in the second step cooling and contacting the remaining vapour with water to absorb acrolein. The present inventors also have found that the concentration and purification of the aqueous acrolein solution can be smoothly conducted by distillation when the aqueous acrolein solution is distilled independently without combining with the condensate. Thus, an industrial optimum acrolein recovering process has been established.

An object of the present invention is to provide a process for recovering acrolein in high yield.

Another object of the present invention is to provide a process for recovering acrolein smoothly by preventing the blocking of the acrolein distillation column caused by the formation of polymers.

To accomplish these objects, the present invention provides a process for recovering acrolein in a form of aqueous solution containing mainly acrolein by means of quenching from a gaseous reaction mixture obtained by gas phase catalytic oxidation of propylene and containing mainly carbon mono- and dioxides, steam, acetaldehyde, propionaldehyde, acetone, organic acids such as acrylic acid and acetic acid, small amount of tarry materials, peroxides, diluent, propylene and oxygen as impurities, an improvement which comprises the steps of (1) Quenching said reaction mixture down to a temperature of 30° to 80° C. to separate the resultant condensate containing mainly water, organic acids such as acrylic acid and acetic acid, small amount of tarry materials, peroxides and a part of acrolein from uncondensed vapour, and (2) Absorbing said uncondensed vapour at a temperature of 0° to 30° C. into water of a temperature of 0° to 30° C. to obtain an aqueous solution containing mainly acrolein.

The present invention also provides a process for recovering acrolein which comprises quenching the gaseous reaction mixture obtained by gas phase catalytic oxidation of propylene down to a temperature of 80 to 30° C., separating the condensate from the remaining vapour, after or at the same time of said quenching, quenching the remaining vapour to a further lower temperature, contacting the remaining vapour with water to form an aqueous acrolein solution, and distilling the aqueous solution to obtain a concentrated aqueous solution of acrolein, said separated condensate being distilled independently to recover an additional acrolein.

The practice of the present invention will be hereunder explained in detail. The gaseous reaction mixture from which acrolein is recovered is obtained through the oxidation reaction according to the known process where propylene is oxidized with oxygen on the catalyst bed in the presence of a diluent such as steam or nitrogen usually under the condition of a temperature of 230 to 500° C. and a pressure of 0.1 to 10 atmospheric pressure. There is used in such process the known catalyst such as the bismuth phosphomolybdate type, copper type, tellurium type or tin and antimony type.

The reaction mixture thus obtained usually contains not only acrolein generally in an amount of 0.5 to 10 percent by volume but also other various impurities produced in the reaction, such as carbon mono- and dioxides, steam, carbonyl compounds, e.g., acetaldehyde, propionaldehyde and acetone, organic acids, e.g., acrylic acid and acetic acid, and small amount of tarry materials and peroxides, as well as the diluent and unreacted propylene and oxygen.

In the process according to the present invention, the gaseous reaction mixture as mentioned above is quenched at first stage to a temperature of 30 to 80° C., and preferably 40 to 80° C., and whereby a condensate containing organic acids, peroxides, tarry materials and some amount of acrolein is partially condensed.

The present inventors have found that when the quenching is effected at such a relatively high temperature and whereby the condensate is formed, the substances which cause the loss of acrolein, such as peroxides and organic acids, can be effectively separated into the condensate, but the simultaneous condensation of acrolein can be retained in small amount, and subsequent acrolein-recovering procedures are carried out smoothly without any troubles. When the quenching temperature is below the lower limit of the range, the amount of the condensed acrolein increases, and even if acrolein is intended to be recovered therefrom, the yield becomes poor, because the acrolein in the condensate is easily polymerizable due to the coexistence with peroxides and organic acids. On the contrary, the quenching temperature above the upper limit of the range is also undesirable, because it makes difficult to condense the detrimental impurities such as organic acids and peroxides. The quenching may be carried out indirectly by the use of cooling water or other suitable cooling medium, or directly by the use of the partially condensed liquor, that is, by the use of the condensate itself after cooling. It goes without saying that the quenching is preferably effected as fast as possible.

The remaining vapour separated from the condensate at the first quenching step according to the present invention is further cooled to a lower temperature at the second step, if desired, after combined with vapour which is stripped from the condensate and contains acrolein, in a way as stated below, and is contacted with water in an absorption column to form an aqueous acrolein solution. The amount of water employed for contacting with acrolein is 50 to 200 mols, preferably 90–150 mols, per 1 mol of acrolein. The cooling temperature at this stage may be any suitable one at which the absorption of acrolein is effected by the use of water of the ordinary temperature, and it may be 30 to 0° C., and preferably 25 to 5° C. The cooling may be effected indirectly either before or after the remaining vapour enters in the absorption column. It may be also carried out directly by the use of absorbing water itself cooled at below the ordinary temperature with accompanying absorption of acrolein.

In such a way, acrolein can be recovered in the form of an aqueous solution with a high yield of above 85 percent based on the weight of acrolein present in the gaseous reaction mixture. Though the aqueous solution may be ready for use, it is generally concentrated and purified by subjecting it to distillation, because it is of too low concentration. The distillation is carried out by the ordinary method preferably under a pressure of 70 mm. Hg to atmospheric pressure and at a temperature of −1 to 53° C. When a small amount such as below 10 p.p.m. of polymerization inhibitor is added, the aqueous acrolein solution can be more easily treated in the distillation.

The condensate separated from the gaseous reaction mixture in the first quenching step, on the other hand, may be either discarded due to its small content of acrolein, or subjected to distillation to recover acrolein therefrom, if desired. However, it should be avoided to distill the condensate together with the aqueous acrolein solution obtained by the second quenching step as mentioned above. In the process according to the present invention, it is necessary to separately distill the both liquors. By conducting distillation in such a way, it has been achieved in the distillation of the aqueous acrolein solution to prevent the blocking of the distillation column and also to reduce the loss of acrolein.

The distillation of the condensate is carried out preferably by blowing steam into the condensate to remove acrolein from the condensate, and thereby acrolein can be easily recovered in high efficiency. It is necessary in the distillation to select the structure of the distillation column as simple as possible and the distillation temperature as low as below 105° C. and preferably below 100° C., even at the highest temperature point in the column, since acrolein still tends to polymerize in the column. It goes nothing to say that the suitable polymerization inhibitor may be used in the distillation. The vapour containing acrolein stripped from the condensate is immediately cooled to allow to condense, and when the resulting condensed liquor forms two phases, acrolein is recovered from the acrolein rich layer and the aqueous acrolein lean layer is preferably combined with the aqueous acrolein solution already stated and subjected to the successive treatments. Alternatively, the stripped vapour, without being condensed, may be combined immediately with the vapour leaving the quenching column or introduced into the distillation column for concentrating the aqueous acrolein solution.

An embodiment of the present invention will be illustrated with reference to the attached drawings. FIG. 1 shows the schematic flow sheet of the process according to the present invention. The gaseous reaction mixture containing acrolein which leaves the catalytic oxidation reactor (not shown) is introduced through line 1 into quenching column 2 where the gaseous reaction mixture is quenched by directly contacting with partially condensed liquor (condensate) recycling through the line 3, pump 4, cooler 5 and line 6 and cooled on the way by cooling water in cooler 5. A part of the recycling liquor is withdrawn from the outlet of pump 4 and immediately introduced through line 7 into the upper portion of distillation column 8 where acrolein is stripped from the condensate with steam directly blown thereinto from the bottom through line 9. The residual liquor of such stripping is discarded from the bottom through line 10. This liquor contains organic acids, peroxides and tarry materials. The stripped vapour containing acrolein and withdrawn from the column through line 11 is combined with the vapour leaving quenching column 2 through line 12 and together supplied through line 13 to cooling column 14. In the cooling column 14, the combined vapour is cooled by contacting it with an aqueous acrolein solution recycling therein through line 15, pump 16 and line 18 and cooled, on the way, by a brine in cooler 17. The cooled gas is immediately contacted in absorption column 20 with water supplied from line 21 at the top of the column, and acrolein is absorbed in water to form an aqueous solution of acrolein. A part of the aqueous acrolein solution is withdrawn and supplied through line 19 to distillation column 23 where the solution is concentrated and purified. A gas component which is not absorbed in water is discarded to the atmosphere from the top of the absorption column through line 22. Acrolein is driven off from the distillation column by heating the introduced aqueous solution in the boiling part thereof with a heating medium such as steam introduced into line 24, and the residual solution is withdrawn and discarded through line 25. The vapour mainly containing acrolein which is withdrawn from distillation column 23 through line 26 is cooled to give a concentrated aqueous solution of acrolein. It goes nothing to say that a part of the concentrated aqueous solution may be preferably recycled and refluxed in the distillation column 23.

Figure 2:
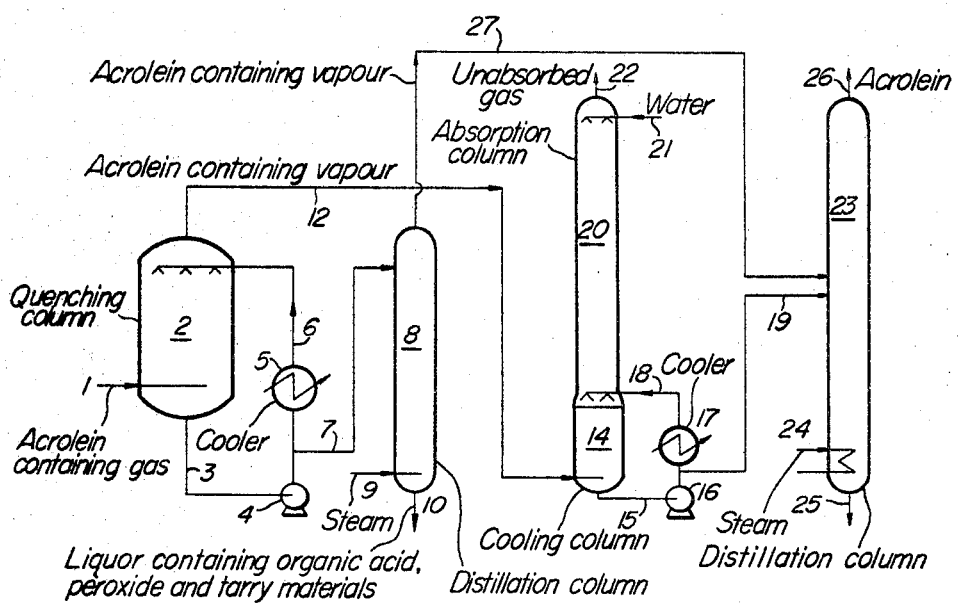

FIG. 2 shows another flow scheme of the present method. In FIG. 2, line 27 is provided in place of line 11 of FIG. 1. That is, in FIG. 2 the stripped vapour from the distillation column 8 is introduced directly into the distillation column 23 through the line 27. Other numerals, that is, 1–10 and 12–26 of FIG. 2 are identical to those of FIG. 1.

According to the present invention, acrolein can be, thus, recovered in the form of an aqueous solution in high yield. In addition, the distillation of the aqueous solution can be effected continuously for long time without any blocking of the distillation column, and acrolein can be recovered advantageously in commerce with preventing the polymerization of acrolein.

The present invention is further illustrated with reference to the following example which should not be construed to limit the present invention.

EXAMPLE 1

An apparatus as shown in FIG. 1 was assembled. Acrolein was recovered according to the following procedure as mentioned above from the gaseous reaction mixture obtained by the oxidation of propylene in the presence of steam on the known catalyst bed for acrolein production:

3.84 kg./hour of said reaction mixture was introduced into the quenching column 2 at a temperature of about 300° C. The quenching temperature $T_1$ (° C.) in quenching column 2 was varied in several runs by controlling the amount of the cooling water passing in cooler 5. Other conditions were same in each run and they were:

Amount of the recycling condensate in quenching column 2 _____liters/hr__ 100
Amount of the heating steam passing line 9 in column 8 _____kg./hr__ 0.24
Amount of the absorbing water at a temperature of 20° C. introduced into column 20 ___liters/hr__ 7
Temperature of columns 14 and 20 ____° C___ 19 to 20
Amount of the vent gas leaving column 20 kg./hr__ 2.34

Under such conditions, there were conducted three runs in which the quenching temperature $T_1$ was maintained at 40° C. in Run 1 and at 50° C. in Run 2, respectively, according to the present invention, and at 20° C. in Run 3 wherein the condensate and the aqueous solution of acrolein were combined by connecting line 7 and line 15, according to the prior art. The results are shown in the table below. Peroxides are detected in the condensate in line 7 but not in the aqueous solution of acrolein in line 19.

The blocking of column 23 was not encountered at all through two months' continuous distillation of the aqueous acrolein solutions in Runs 1 and 2, while it occurred only after 7 days' distillation in Run 3.

TABLE

|  | Run No. | | |
|---|---|---|---|
|  | 1 | 2 | 3 |
| $T_1$, ° C | 40 | 50 | 20 |
| Amount (g./hour) in line 7 of — | | | |
| Liquid stream | 1,026 | 881 | ---------- |
| Acrolein | 9.0 | 5.5 | ---------- |
| Hydrated acrolein | 27.7 | 27.1 | ---------- |
| Acids | 20.1 | 19.2 | ---------- |
| Amount (g./hour) in line 10 of — | | | |
| Liquid stream | 1,140 | 964 | ---------- |
| Acrolein | 0.0 | 0.0 | ---------- |
| Hydrated acrolein | 27.7 | 27.1 | ---------- |
| Acids | 20.1 | 19.2 | ---------- |
| Amount of vapour stream in line 11 (g./hour) | 126 | 158 | ---------- |
| Amount of gas stream in line 12 (g./hour) | 2,810 | 2,960 | 1,500 |
| Amount (g./hour) in line 19 of — | | | |
| Liquid stream | 6,100 | 6,280 | 8,500 |
| Acrolein | 187.0 | 188.5 | 177.1 |
| Hydrated acrolein | 3.1 | 4.4 | 42.8 |
| Acids | 1.5 | 2.4 | 21.6 |
| Acids separated into line 10, percent | 93.1 | 88.9 | ---------- |
| Recovering yield of acrolein as far as line 19, percent | 86.0 | 85.7 | 80.5 |
| Recovering yield of acrolein as far as line 26, percent | 85.5 | 85.2 | 76.5 |

What we claim is::

1. In a process for recovering acrolein in a form of a concentrated aqueous solution containing mainly acrolein by means of quenching from a gaseous reaction mixture obtained by gas phase catalytic oxidation of propylene and containing mainly carbon mono- and dioxide, steam, acetaldehyde, propionaldehyde, acetone, organic acids such as acrylic acid and acetic acid, small amount of tarry materials, peroxides, diluent, propylene and oxygen as impurities, and improvement which comprises the steps of:

(1) quenching said reaction mixture down to a temperature of 30° to 80° C. to separate the resultant condensate containing mainly water, organic acids such as acrylic acid and acetic acid, small amount of tarry materials, peroxides and a part of acrolein from uncondensed vapour, (2) distilling said condensate obtained at the step (1) to strip a vapour containing acrolein, (3) combining said vapour obtained at the step (2) and containing acrolein with said uncondensed vapour obtained at the step (1), (4) absorbing said combined vapour obtained in step (3) at a temperature of 0° to 30° C. into water of a temperature of 0° to 30° C. to obtain an aqueous solution containing mainly acrolein, and (5) distilling said aqueous solution obtained at the step (4) and containing mainly acrolein under a pressure of from 70 mm. Hg to atmospheric pressure and at a temperature of —1° to 53° C. to obtain a concentrated aqueous solution containing mainly acrolein.

2. In a process for recovering acrolein in a form of a concentrated aqueous solution containing mainly acrolein by means of quenching from a gaseous reaction mixture obtained by gas phase catalytic oxidation of propylene and containing mainly carbon mono- and dioxide, steam, acetaldehyde, propionaldehyde, acetone, organic acids such as acrylic acid and acetic acid, small amount of tarry materials, peroxides, diluent, propylene and oxygen as impurities, and improvement which comprises the steps of:

(1) quenching said reaction mixture down to a temperature of 30° to 80° C. to separate the resultant condensate containing mainly water, organic acids such as acrylic acid and acetic acid, small amount of tarry materials, peroxides and a part of acrolein from uncondensed vapour, (2) absorbing said uncondensed vapour obtained at the step (1) at a temperature of 0° to 30° C. into water of a temperature of 0° to 30° C. to obtain an aqueous solution containing mainly acrolein, (3) distilling said aqueous solution obtained at the step (2) and containing mainly acrolein under a pressure of from 70 mm. Hg to atmospheric pressure and at a temperature of −1° to 53° C. to obtain a concentrated aqueous solution containing mainly acrolein, (4) distilling said condensate obtained at the step (1) to strip a vapour containing acrolein, and (5) introducing the stripped vapour obtained at the step (4) into a rectifying zone of the distillation column used in the step (3).

3. An improvement according to claim 1, wherein said distillation at the step (2) is conducted in a steam distillation.

4. An improvement according to claim 2, wherein said distillation at the step (4) is conducted in a steam distillation.

References Cited
UNITED STATES PATENTS

| | | | |
|---|---|---|---|
| 2,514,966 | 7/1950 | Pierotti et al. | 260—604 |
| 2,514,968 | 7/1950 | Dunn | 203—42 |
| 2,606,932 | 8/1952 | Cole et al. | 260—604 |
| 3,052,724 | 9/1962 | Marullo et al. | 260—604 |
| 3,097,215 | 7/1963 | Courter et al. | 260—604 |
| 3,102,147 | 8/1963 | Johnson | 260—604 |
| 3,159,680 | 12/1964 | Kister | 260—604 |
| 3,172,914 | 3/1965 | Fujiwara et al. | 260—604 |

WILBUR L. BASCOMB, JR., *Primary Examiner.*

U.S. Cl. X.R.

55—94; 203—8, 42, 49, 74, 76, 77, 81, 83